United States Patent
Iguchi et al.

(10) Patent No.: US 8,326,362 B2
(45) Date of Patent: Dec. 4, 2012

(54) WIRELESS BASE STATION, WIRELESS TERMINAL AND WIRELESS COMMUNICATION SYSTEM

(75) Inventors: Michio Iguchi, Fujisawa (JP); Shiro Mazawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 320 days.

(21) Appl. No.: 12/574,789

(22) Filed: Oct. 7, 2009

(65) Prior Publication Data

US 2010/0144358 A1 Jun. 10, 2010

(30) Foreign Application Priority Data

Oct. 8, 2008 (JP) ................................. 2008-261207

(51) Int. Cl.
*G06F 15/16* (2006.01)
(52) U.S. Cl. ....................................... 455/561; 455/436
(58) Field of Classification Search .................. 455/434, 455/436, 456.4, 560, 561
See application file for complete search history.

(56) References Cited

U.S. PATENT DOCUMENTS

| 2006/0146753 A1* | 7/2006 | Park et al. ..................... 370/331 |
| 2008/0037502 A1 | 2/2008 | Yokoyama |
| 2011/0077029 A1* | 3/2011 | Okuda ....................... 455/456.4 |

FOREIGN PATENT DOCUMENTS

| JP | 2002-158609 | 5/2002 |
| JP | 2008-048018 | 2/2008 |

* cited by examiner

*Primary Examiner* — Sam Bhattacharya (74) *Attorney, Agent, or Firm* — Antonelli, Terry, Stout & Kraus, LLP.

(57) ABSTRACT

A wireless base station for transmitting and receiving a wireless signal with at least one wireless terminal existing in an area, having a transmitter for transmitting the wireless signal, and a receiver for receiving the wireless signal; a timing management unit for managing the information on start timing of the transmitter and receiver, as well as noticing the information on start timing of the transmitter and receiver to the at least one wireless terminal; and a control unit for performing the switching control of start and stop of the transmitter and receiver.

10 Claims, 9 Drawing Sheets

WIRELESS BASE STATION, WIRELESS TERMINAL AND WIRELESS COMMUNICATION SYSTEM

INCORPORATION BY REFERENCE

The present application claims priority from Japanese application JP2008-261207 filed on Oct. 8, 2008, the content of which is hereby incorporated by reference into this application.

BACKGROUND OF THE INVENTION

The present invention relates to wireless communication technology, in particular, relates to power saving technology of a base station in a wireless communication system.

With prevalence of wireless data communication, installment of a wireless base station is progressing to widen a service area. A cover range, where one wireless base station is possible to perform wireless communication with a wireless terminal, is called "cell". Usually, a wireless base station is installed at a place with a relatively good view, so as to have as wide cell radius as possible. The cover range of a wireless base station is several-hundred meters in a densely-populated area with many buildings, and several-ten kilometers in a place with many fields, however, even in a cell, there may occur a place where a radio wave does not reach or is difficult to reach from a wireless base station, such as inside or underground of a building, or a place behind a building.

On the other hand, a system of a wireless base station covering a very small range, called a femtocell, has been noticed recently. The femtocell has a cell radius of about several meters, and such utilization way is assumed that covers one home or one small office by one wireless base station.

The femtocell is connected to a fixed line (such as a telephone line, an optical fiber or a cable for a CATV) which is connectable to a telephone line in a home, so as to perform communication with a wireless terminal. Therefore, it is expected to cover very finely to the indoor or underground, which has been difficult to cover by a conventional wireless base station. In addition, it is possible to cover also a mountain area where installment of a wireless base station was difficult. In order to connect to a femtocell base station, there is required no change at a wireless terminal side, and connection is possible by a terminal just like a conventional one. In addition to this, there is a merit, for a carrier, that a back bone to provide a service can be strengthened.

As described above, because the femtocell is a system of a wireless base station having a cell radius of about several meters, and the femtocell is utilized by being placed in a home, the number of users connectable is several users at most. However, it is required to be capable of communicating at all times, similarly to a usual wireless base station.

A transmitter of the usual wireless base station keeps transmitting a pilot signal at all times to a wireless terminal existing in a service area. In addition, also a receiver of the wireless base station is in an activation status at all times, and takes a receivable status of a call request signal from a wireless terminal any time.

On the other hand, each wireless terminal receives a signal from a wireless base station by starting a receiver in a constant cycle, to confirm presence or absence of a connection request signal, called paging, addressed to a local terminal, in a received signal. A wireless terminal makes a receiver OFF, in the case where there is no paging addressed to the local terminal. A transmitter of a wireless terminal is always OFF when paging is absent.

In this way, a transmitter of the usual wireless base station keeps transmitting a pilot signal at all times, irrespective of presence or absence of a wireless terminal in a service area, or presence or absence of a call request. In addition, a receiver of the usual wireless base station is in an activation status at all times, so as to receive a call request from a wireless terminal.

However, in the femtocell base station, which is assumed to be installed in a home, it is considered such situation that, in the day time of week days, users are absent and a wireless terminal is absent in a service area, or in midnight or the like, although a wireless terminal is existing in a service area, it is in a continuously standby status and there is little connection to a base station, therefore, an activation status of a transmitter and receiver at all times, by same operation as in the usual wireless base station, results in only useless power consumption. Therefore, in the femtocell base station, development of technology for low power consumption has been required.

As a method for suppressing the power consumption of a wireless base station, there is technology, for example, described in JP-A-2002-158609. In this invention, such a method for shifting to a power saving mode has been proposed that a wireless base station transmits a shift signal to a power saving mode, to a wireless terminal in a service area, and by negotiation between the wireless base station and the wireless terminal, start timing of a receiver of the wireless terminal is made the same, so as to transmit a signal from the wireless base station in matching to that timing. In addition, such a method has also been proposed that a receiver of the base station also performs ON/OFF in matching to a transmitter.

SUMMARY OF THE INVENTION

As described above, the femtocell base station has different utilization form, installation place, network configuration or the like from the conventional wireless base station. Therefore, in order to attain power saving of the femtocell base station, it is required to solve some problems which were not solved by conventional power saving technology of a wireless base station. For example, in conventional technology, a receiver of a wireless base station performs ON/OFF switching in matching to a transmitter of a wireless base station, however, in the case where paging is included in a transmitting signal from a wireless base station, there is a problem that a call request signal from a wireless terminal can not be received, when the receiver of the base station is OFF at the same time as the transmitter. In addition, in such a case where a wireless terminal is absent, and a case where a standby status is continued, there is a problem to be solved on how to switch the power saving mode, depending on difference of a status of the wireless terminal.

The present invention is one to solve these problems and it is an object to attain power saving of a small size base station of an indoor installment-type such as the femtocell base station. In addition, it is an object of the present invention to provide a wireless communication system and a wireless terminal corresponding to the small size base station of an indoor installment-type having a power saving mode.

In order to solve the problems, in the present invention, there is provided a wireless base station for transmitting and receiving a wireless signal with at least one wireless terminal existing in an area, characterized by having: a transmitter for transmitting the wireless signal, and a receiver for receiving the wireless signal; a timing management unit for managing the information on start timing of the transmitter and receiver, as well as noticing the information on start timing of the transmitter and receiver to the at least one wireless terminal;

and a control unit for performing the switching control of start and stop of the transmitter and receiver, wherein the control unit is designed to control start and stop of the transmitter and receiver, based on information on start timing, which is managed by the timing management unit.

In more detail, information on start timing of the transmitter and receiver, which the timing management unit manages, is information on start timing of the at least one wireless terminal; and the control unit is designed to control start and stop of the transmitter and receiver, in matching to the start timing of at least one wireless terminal in an area, based on information on start timing of the at least one wireless terminal in the area, which is managed by the timing management unit.

In addition, the control unit is designed to transmit a wireless signal by starting the transmitter, based on information on the start timing, and, during time other than the start timing, to control so as to stop the transmitter.

Still more, the control unit is designed to start the receiver, in matching to the start timing of the transmitter, as well as, in stopping time of the transmitter, to stop the receiver, after certain time predetermined in advance has passed.

In addition, there is provided a wireless base station for transmitting and receiving a wireless signal with a wireless terminal, as well as transmitting and receiving the information via an higher rank apparatus connected to a communication network, characterized by having: a transmitter for transmitting the wireless signal, and a receiver for receiving the wireless signal; a timing management unit for managing the information on start timing of the wireless terminal; and a control unit for performing the switching control of start and stop of the transmitter and receiver, wherein the control unit, when information is received that a wireless terminal, which has been connected before to a local wireless base station, was location-registered to other wireless terminal from the higher rank apparatus via the communication network, is designed to control start and stop of the transmitter, in a longer cycle as compared with the time when the wireless terminal was connected to the local wireless base station, based on information on start timing of the wireless terminal, which is managed by the timing management unit.

According to the present invention, a small size base station of an indoor installment-type in consideration of power saving can be provided. In addition a wireless communication system and a wireless terminal corresponding to the small size base station of an indoor installment-type having a power saving mode can be provided.

Other objects, features and advantages of the invention will become apparent from the following description of the embodiments of the invention taken in conjunction with the accompanying drawings.

DETAILED DESCRIPTION OF THE INVENTION

Explanation will be given below on embodiment of the present invention by using a plurality of embodiments.

Explanation will be given, in the following embodiments, on an 1×EV-DO system as an example of a system configuration.

First, explanation will be given on a configuration of a whole network containing a wireless communication system where the present invention is applied, with reference to FIG. 1.

Figure 1:
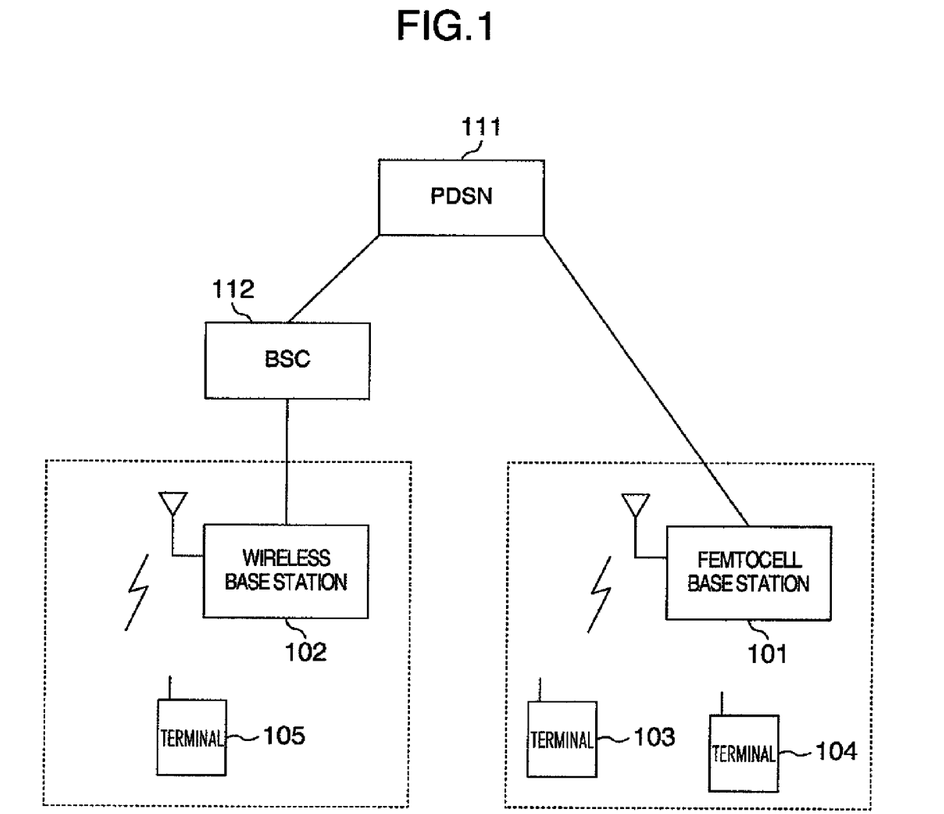
FIG. 1 is a drawing explaining a configuration of a whole network containing a wireless communication system where the present invention is applied.

FIG. 1 is a operational diagram of a whole network containing a 1×EV-DO wireless communication system using a femtocell base station.

The wireless communication system of FIG. 1 is configured with a femtocell base station 101, a usual macro cell wireless base station 102, a plurality of wireless terminals 103, 104 and 105, a base station controller (hereafter, BSC) 112 for performing the management of location information or the like of the wireless base station and the wireless terminals, as well as controlling these, and a packet data serving node (hereafter, PDSN) 111 for performing the control of packet transmission and reception of a whole network containing the wireless communication system. The usual wireless base station is connected to the PDSN via the base station controller. On the other hand, the femtocell base station is connected to the PDSN via a fixed line (such as a telephone line, an optical fiber or a cable for a CATV) which is connectable to a telephone line in a home.

Then, explanation will be given on a configuration of the femtocell base station in one embodiment of the present invention, with reference to FIG. 2.

Figure 2:
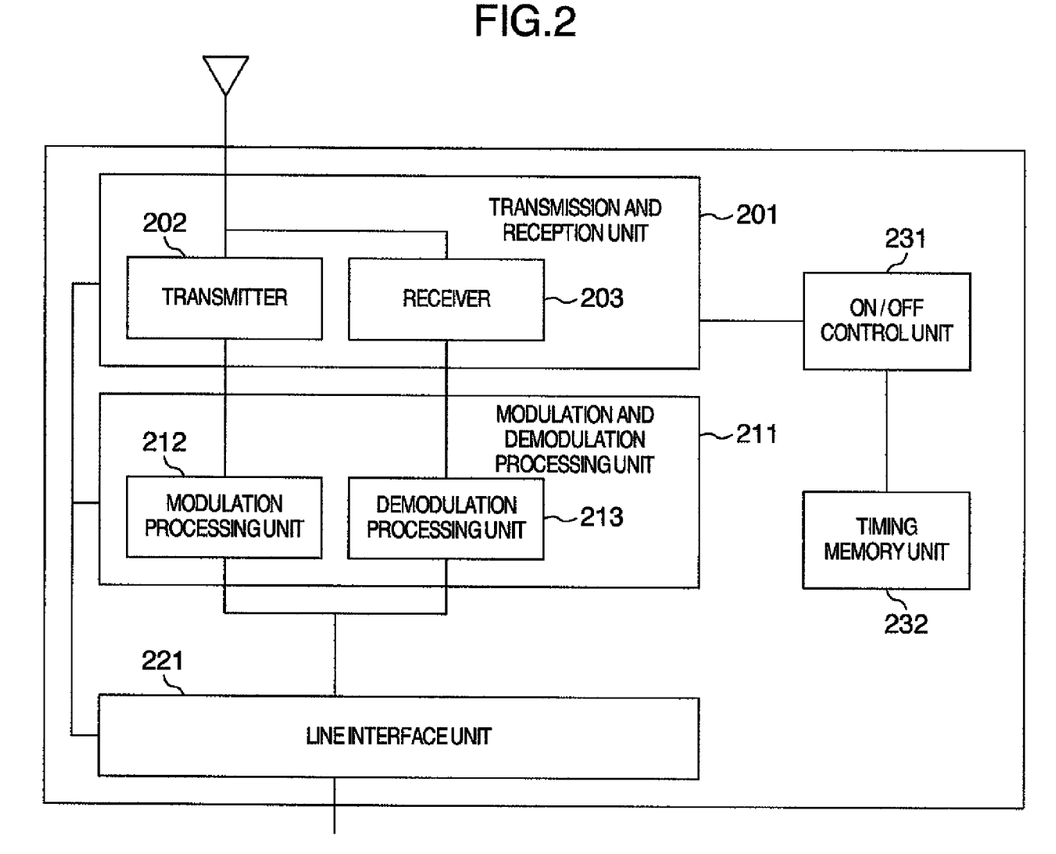
FIG. 2 is a drawing explaining a configuration of a femtocell base station in one embodiment of the present invention.

FIG. 2 is a drawing showing a block configuration example of the femtocell base station in one embodiment of the present invention.

The femtocell base station 101 is configured with a transmission and reception unit 201 configured with a transmitter 202 of the wireless signal and a receiver 203 of the wireless signal; a modulation and demodulation processing unit 211 configured with a modulation processing unit 212 for performing the modulation of a transmitting signal, and a demodulation processing unit 213 for performing the demodulation of a received signal; and a line interface unit 221 which becomes an interface with the PDSN.

The femtocell base station of the present invention is characterized by having a control unit 231 for controlling the ON/OFF switching of a transmitter and a receiver, and a timing management unit 232 for managing the start timing of a wireless terminal, as well as general communication function which the femtocell base station has. In this way, in the femtocell base station of the present invention, the transmitter 202 transmits a signal, in matching to start timing of a receiver of a wireless terminal existing in a service area of a local station.

In addition, the femtocell base station of the present invention has function to transmit notice information specific to the femtocell base station of the present invention, which was not performed in a usual macro-cell wireless base station. This notice information is also designed to notice ON/OFF timing of a receiver 203 of the femtocell base station to a wireless terminal, in the case where the femtocell base station is acting under a power saving mode, in addition to information to be included in notice information by the usual wireless base station. The wireless terminal performs call request or signal transmission, in matching to ON timing of the receiver 203 of the femtocell base station, based on the notice information from the femtocell base station.

In addition, the receiver 203 of the femtocell base station becomes ON at the same timing when a transmitter 202 of the femtocell base station becomes ON. The receiver 203 of the femtocell base station keeps an ON status for a while after the transmitter 202 of the femtocell base station became OFF, in preparation for the case where a wireless terminal, which received a pilot signal transmitted from the femtocell base station, transmits a signal, and then transfers to an OFF status.

Figure 3:
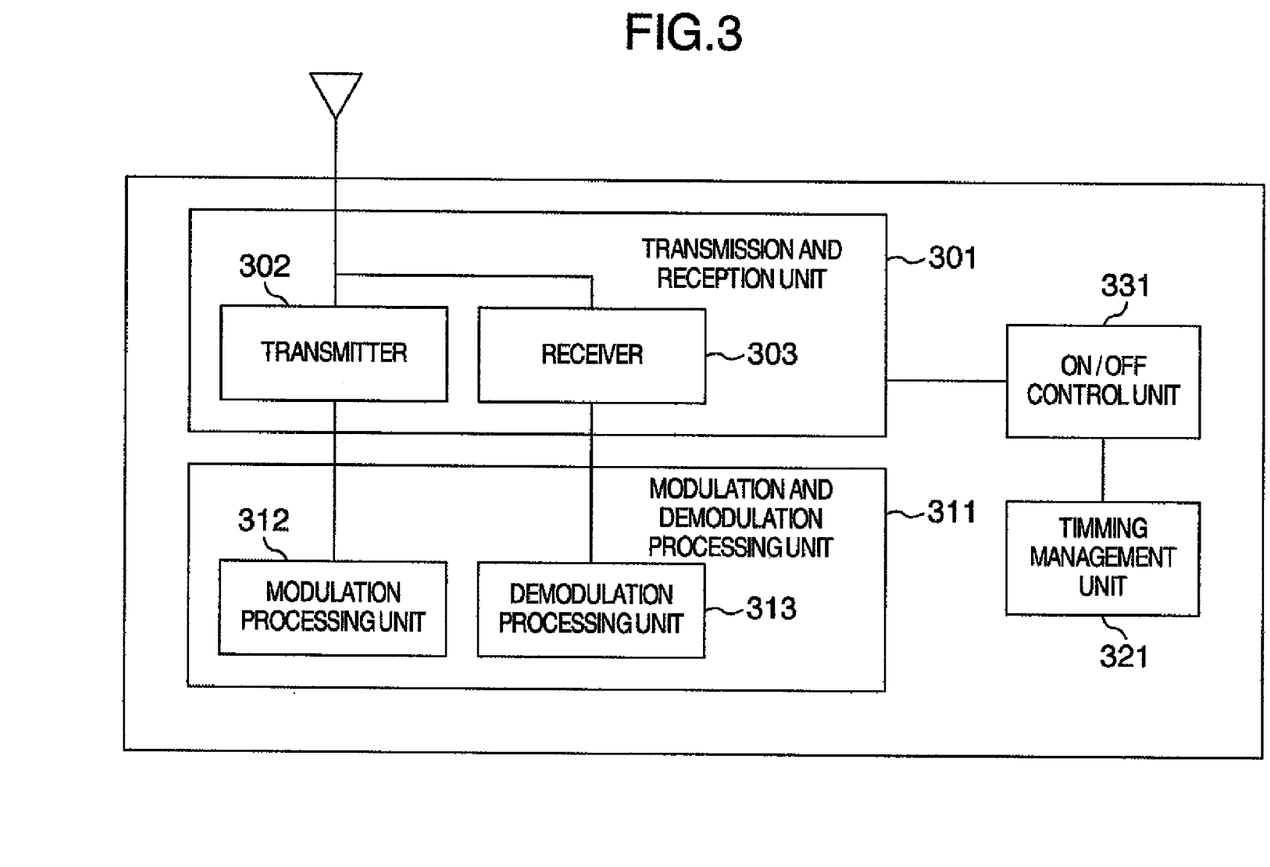
FIG. 3 is a drawing explaining a configuration of a wireless terminal in one embodiment of the present invention.

Then, explanation will be given on a configuration of a wireless terminal in one embodiment of the present invention.

FIG. 3 is a block diagram explaining a configuration of a wireless terminal in one embodiment of the present invention.

The wireless terminal in one embodiment of the present invention has a transmission and reception unit 301 configured with a transmitter 302 and a receiver 303 of the wireless signal; a modulation and demodulation processing unit 311 configured with a modulation processing unit 312 for performing the modulation of a transmitting signal, and a demodulation processing unit 313 for performing the demodulation of a received signal. Still more, the wireless terminal of the present invention has a timing management unit 321 for managing the start timing of the receiver 203 of the femtocell base station; and an ON/OFF control unit 331 for controlling ON/OFF of the transmitter of the wireless terminal. In this way, the wireless terminal performs call request in matching to start timing of the receiver of the femtocell base station 203, in a service area of a base station. In addition, the wireless terminal receives a wireless signal transmitted intermittently from the base station, and recognizes an operational mode of the base station from the wireless signal thereof.

Then, explanation will be given on behaviors of the femtocell base station and the wireless terminal.

First, explanation will be given on behaviors of the femtocell base station, which do not have a configuration characteristic to the present invention, and the wireless terminal, with reference to FIG. 4.

Figure 4:
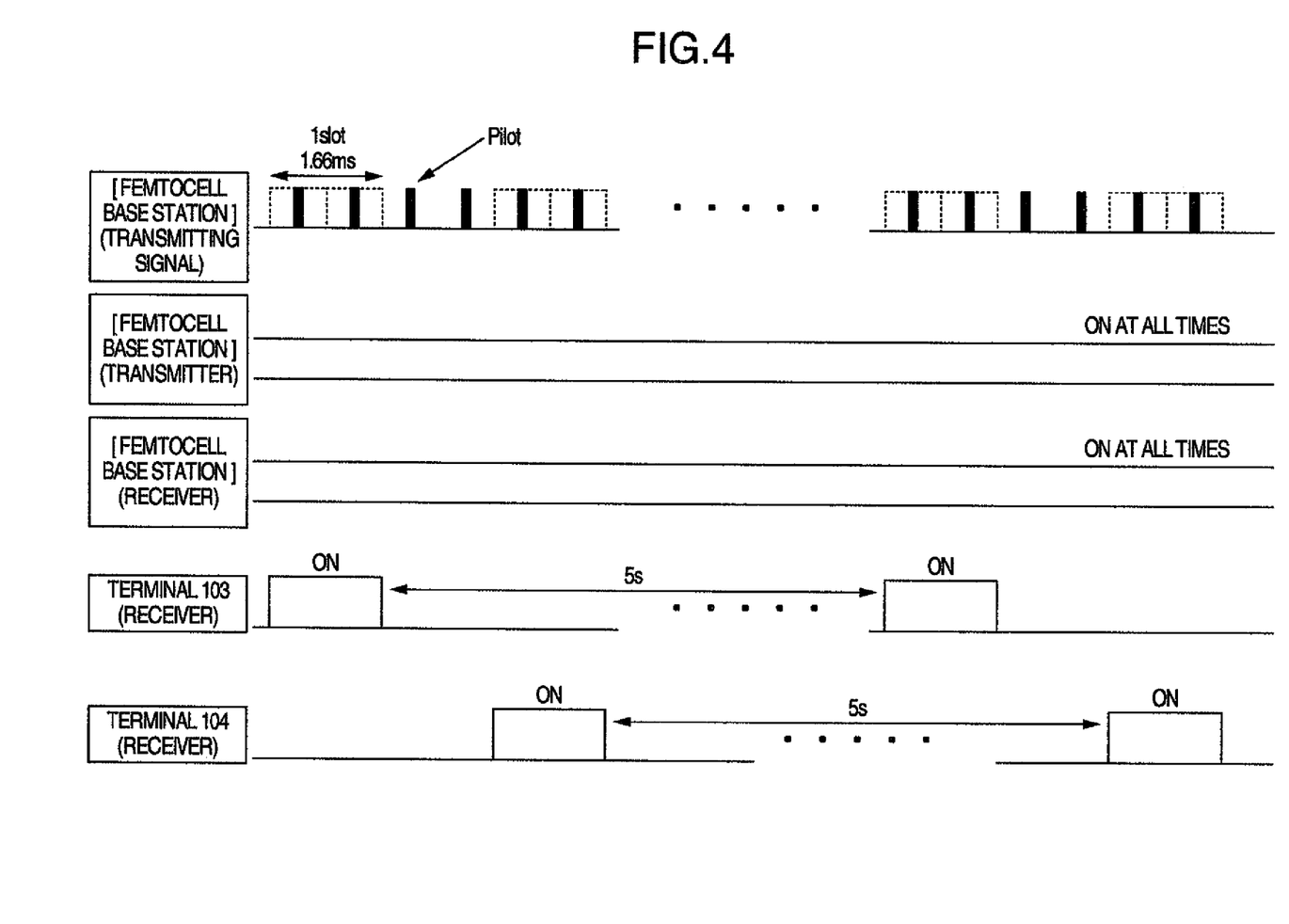
FIG. 4 is a drawing explaining an operational status of a femtocell base station and a wireless terminal.

In FIG. 4, the top line represents presence or absence of a transmitting signal of the femtocell base station. In addition, an ON/OFF status of a transmitter of the femtocell base station is shown at the line below, and an ON/OFF status of a receiver of the femtocell base station is shown at the line further below. Still more, operational status of the wireless terminal 103 and the wireless terminal 104 are shown at the line below.

In the case where the wireless terminals 103 and 104 are in a standby status, a transmitter of the femtocell base station keeps transmitting a pilot signal at all times to a wireless terminal existing in a service area. In addition, also a receiver of the femtocell base station is in an activation status at all times, and takes a receivable status of a call request signal from the wireless terminals 103, 104 any time. The wireless terminals 103, 104 starts respectively the receiver in a constant cycle, to confirm presence or absence of a connection request signal, called paging, addressed to a local terminal, and makes the receiver OFF, in the case where there is no paging. In addition, the transmitter of the wireless terminal is always OFF when paging is absent.

In this way, in the case of the femtocell base station, which does not have a configuration specific to the present invention, the transmitter of the femtocell base station keeps transmitting a pilot signal at all times, irrespective of presence or absence of a wireless terminal in a service area, or presence or absence of a call request. In addition, the receiver of the femtocell base station is in an activation status at all times, to receive a call request from the wireless terminal.

However, the femtocell base station is assumed to be installed in a home, therefore, it is considered that situation of useless power consumption, by starting the transmitter and receiver of the base station at all times, generates more frequently, as compared with a conventional macro-cell base station, in the case where the wireless terminal does not exist in a service area of the femtocell base station due to absence etc., or the case that, although the wireless terminal exists in a service area of the base station, it is in a continuously standby status and there is no connection to the base station. In consideration of such a situation, the femtocell base station and the wireless terminal of the present invention are designed to operate under a power saving mode effectively, and explanation thereof will be given below specifically.

First, as explained in FIG. 4, a status that a pilot signal is kept transmitting at all times, irrespective of presence or absence of the wireless terminal in a service area, or presence or absence of a call request, or a status that the receiver of the femtocell base station is in an activation status at all times, to receive a call request from the wireless terminal will be called a usual mode in the present invention.

Then, explanation will be given on another operational mode of the present invention.

Figure 5:
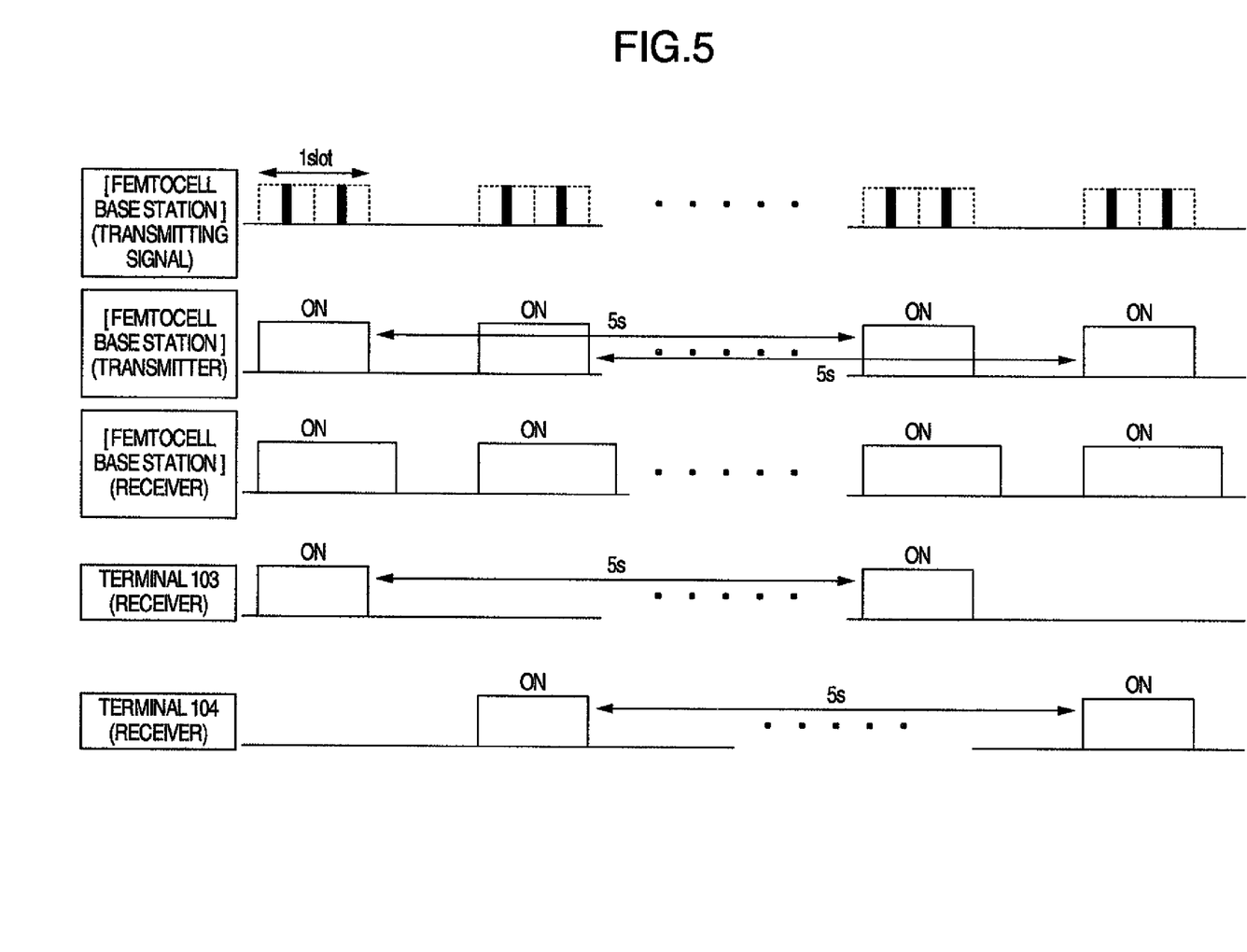
FIG. 5 is a drawing explaining an operational status of a femtocell base station and a wireless terminal.

FIG. 5 is a drawing explaining another operational mode of the present invention.

In FIG. 5, the top line represents a transmitting signal of the femtocell base station of the present invention. An ON/OFF status of the transmitter 202 of the femtocell base station is shown at the line below, and an ON/OFF status of the receiver 203 of the femtocell base station is shown at the line further below. Still more, a receiver status of the wireless terminal 103 and a receiver status of the wireless terminal 104 are shown at the line below.

In FIG. 5, the wireless terminals 103 and 104 exist in a service area of the femtocell base station 101.

As described above, the femtocell base station is assumed to be installed in a home. Therefore, it is considered that the number of the wireless terminals to be connected to the femtocell base station is limited, and the wireless terminals themselves are specified. Therefore, the femtocell base station enables various controls, which were not possible to perform by the conventional macro-cell wireless base station, by acquiring and managing necessary information including information not managed in the conventional macro-cell wireless base station, relating to a wireless terminal to be connected to local station. As one example, the femtocell base station of the present invention has a timing memory unit 232, and memorizes start timing of receiver of the wireless terminals 103 and 104 in the timing memory unit 232 in advance.

In the case where a connect request signal called paging is absent in a transmitting signal from the femtocell base station to a wireless terminal, and in the case of being in a standby status, where a transmitting signal is not receiving from a terminal, the femtocell base station 101 starts a transmitter of the femtocell base station, by control of an ON/OFF control unit 231, in matching to start timing of the wireless terminals 103 and 104, which was memorized in the memory unit 232, so as to transmit a signal.

In addition, the receiver 203 of the femtocell base station becomes ON at the same timing when the transmitter 202 of the femtocell base station becomes ON.

In the case where paging is included in a transmitting signal from the femtocell base station, the receiver 203 of the femtocell base station is kept an ON status for a while, even after the transmitter 202 of the femtocell base station became OFF, because a call request signal is transmitted from the wireless terminal to the femtocell base station.

After that, the receiver 203 of the femtocell base station becomes OFF after certain time predetermined in advance. In addition, the receiver 203 of the femtocell base station becomes OFF after certain time predetermined in advance, after the transmitter 202 of the femtocell base station became OFF, because there may be the case where call request is transmitted from the wireless terminal, even in the case where paging is absent in a transmitting signal from the base station.

As described above, an operational mode for reducing power consumption of the femtocell base station, by making the transmitter and receiver 202 and 203 of the femtocell base station On/OFF intermittently, is called a sleep mode in the present invention.

Then, explanation will be given on the case where the femtocell base station switches from the usual mode to the sleep mode.

In the case where the receiver 203 of the femtocell base station does not receive a signal from the wireless terminals 103 and 104 in the service area, for a certain time set in advance, the femtocell base station switches to the sleep mode.

Then, explanation will be given on the case where the femtocell base station switches from the sleep mode to the usual mode, with reference to FIG. 6.

Figure 6:
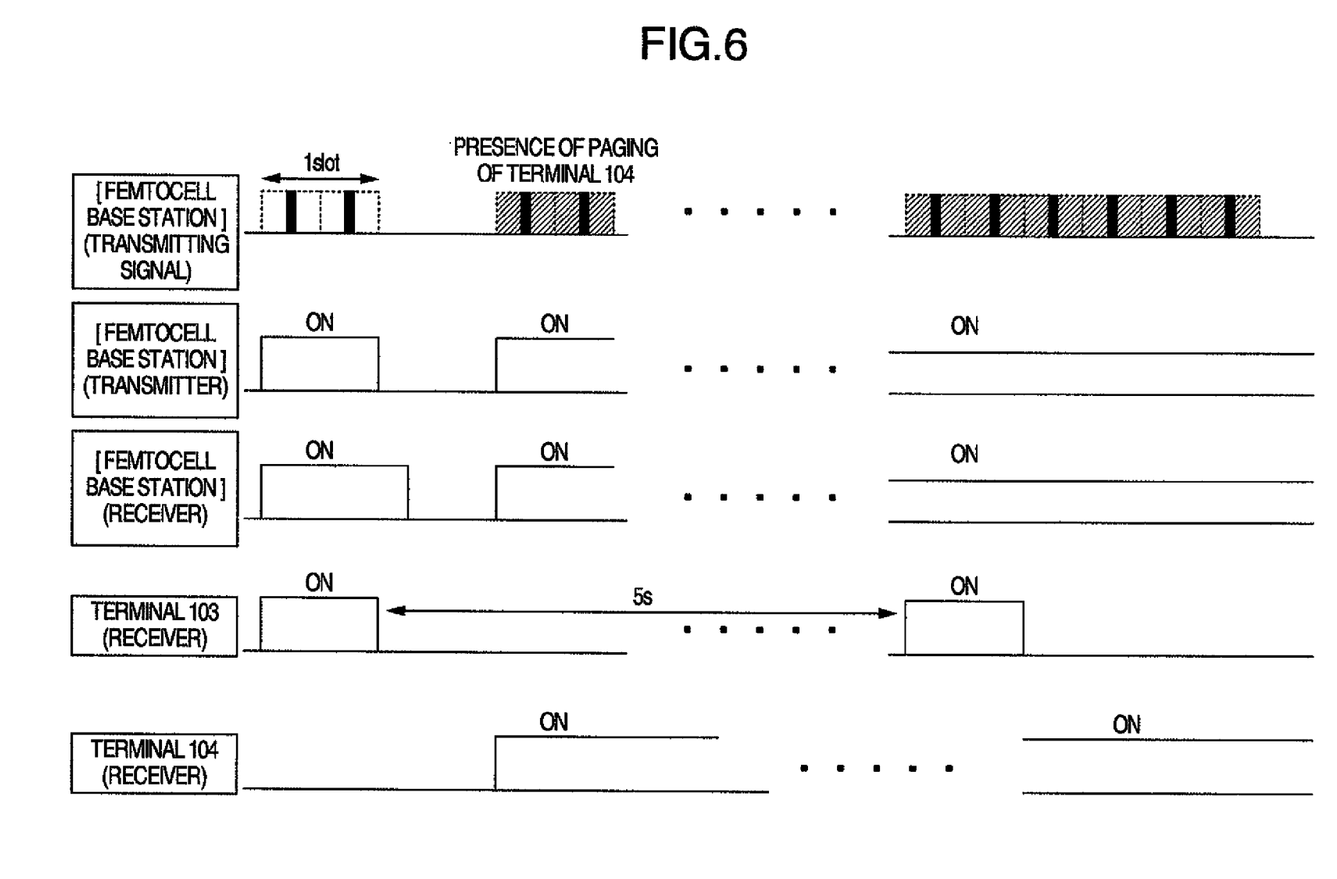
FIG. 6 is a drawing explaining an operational status of a femtocell base station and a wireless terminal.

FIG. 6 is a drawing for explaining the behavior of the femtocell base station switching from the sleep mode to the usual mode.

In FIG. 6 as well, similarly as in FIG. 4 and FIG. 5, a transmitting signal of the femtocell base station, a status of the transmitter of the femtocell base station, a status of the receiver of the femtocell base station, and status of the wireless terminal 103 and the wireless terminal 104 are shown from the top.

In the sleep mode, in the case where paging is included in a transmitting signal from the femtocell base station, switching generates from the sleep mode to the usual mode.

As in FIG. 6, in the case where, for example, paging to the wireless terminal 104 is included in a transmitting signal from the femtocell base station 101, the transmitter 202 of the femtocell base station becomes an ON status to transmit data to the wireless terminal 104 continuously. In addition, the receiver 203 of the femtocell base station takes a behavior of usual mode by becoming an ON status to receive data to be transmitted from the wireless terminal 104. In addition, the wireless terminal 104 makes a transmitter and a receiver an ON status by receiving the paging, and in this way, the femtocell base station 101 and the wireless terminal 104 become a communication mode.

Then, explanation will be given on another operational mode.

Figure 7:
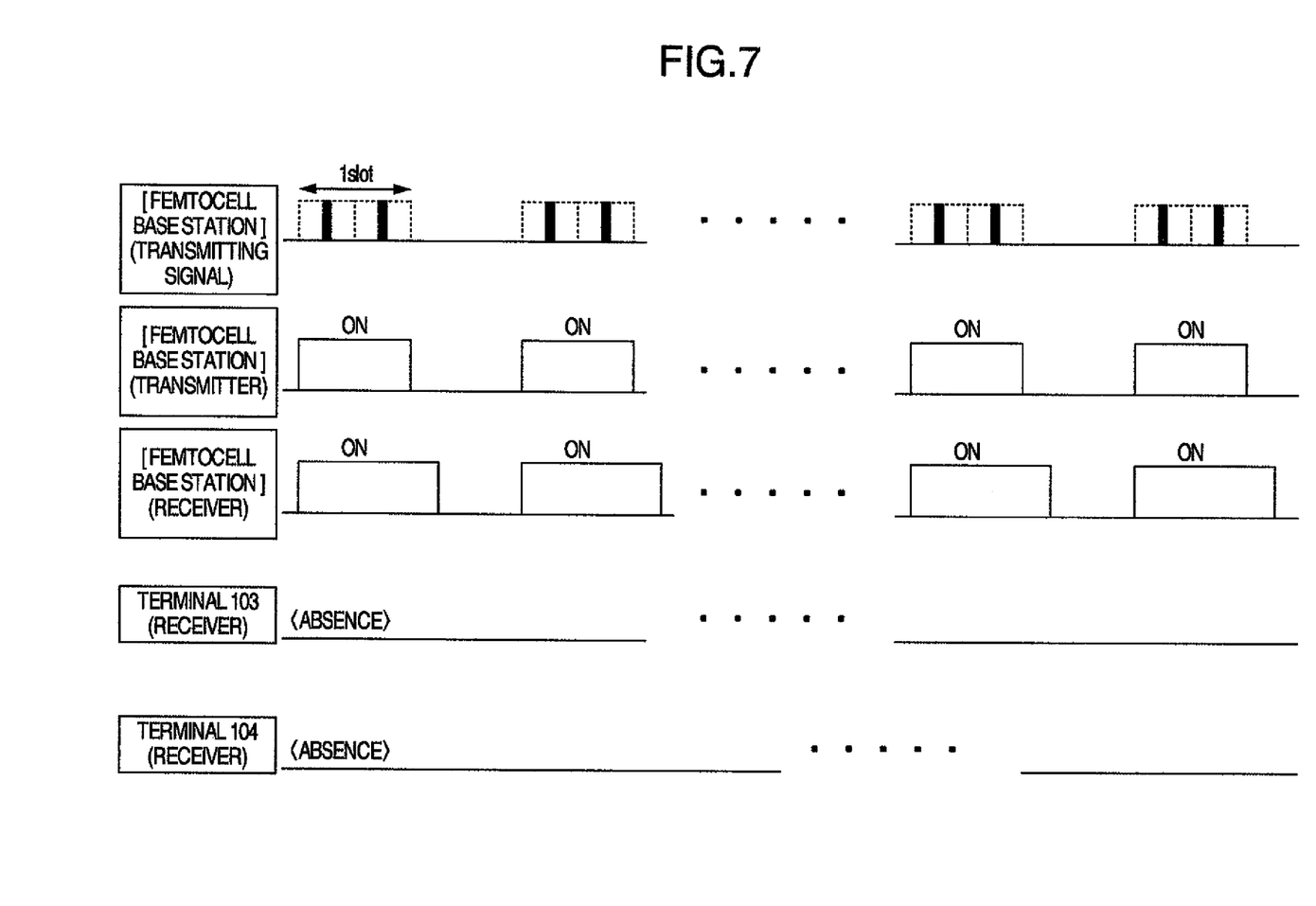
FIG. 7 is a drawing explaining an operational status of a femtocell base station and a wireless terminal.

FIG. 7 shows status of a transmitter and a receiver of a base station, in the case where a wireless terminal does not exist in a service area of the femtocell base station.

In the case where a wireless terminal does not exist in an area, because of transfer of the wireless terminal, which existed in the service area of the femtocell base station 101, to outside of the area, the transmitter 202 of the femtocell base station is started in a longer time cycle as compared with the case of the sleep mode shown previously. In addition, the receiver 203 of the femtocell base station becomes ON at the same time as a transmitter of the base station, similarly as in the sleep mode, and becomes OFF after certain time predetermined in advance, after a transmitter of the base station becomes OFF.

This operational mode is called a long sleep mode.

Then, explanation will be given on the behavior in switching from the sleep mode to the long sleep mode, with reference to FIG. 8.

Figure 8:
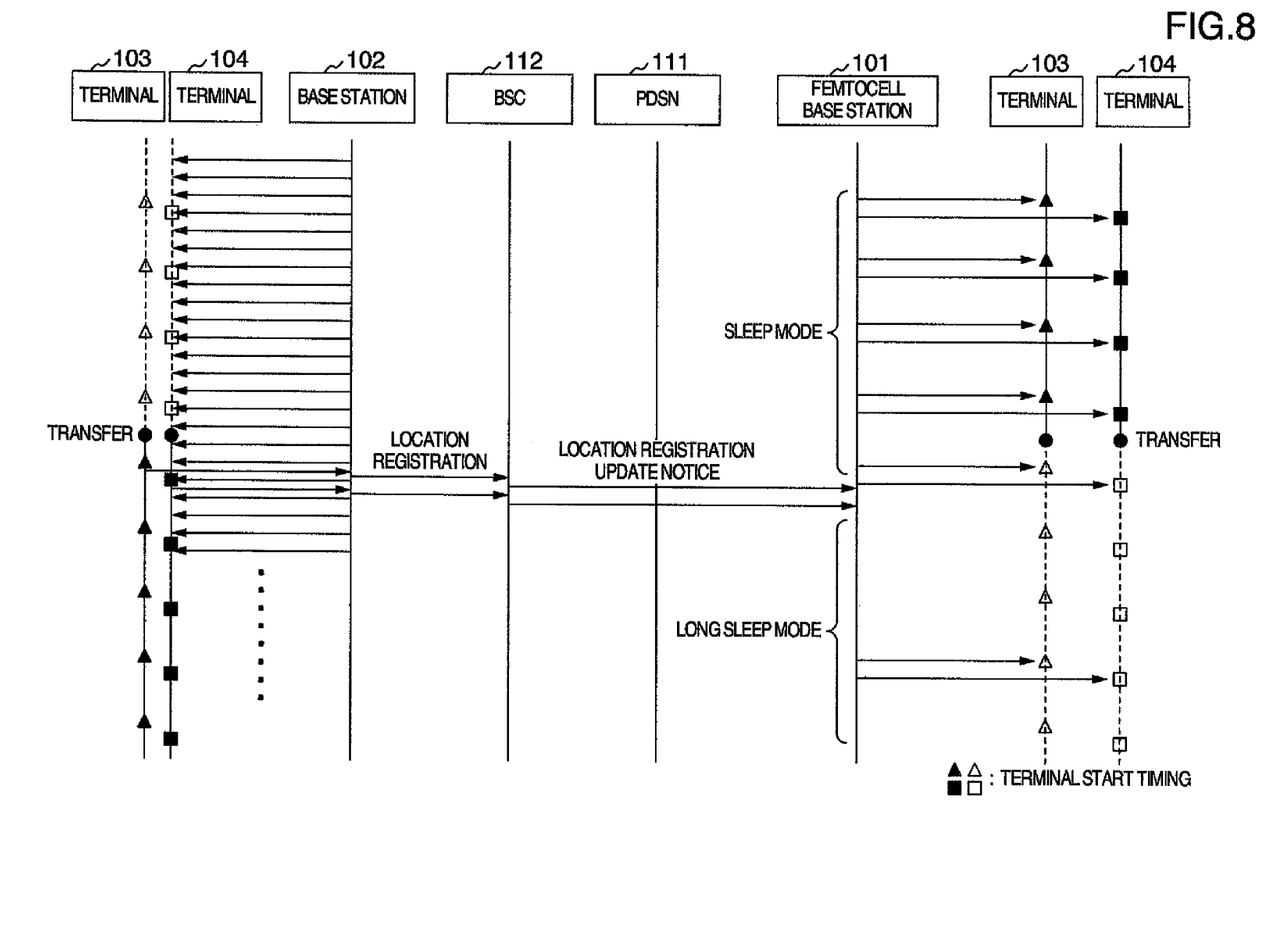
FIG. 8 is a drawing explaining the transition of an operational status of a femtocell base station and a wireless terminal.

FIG. 8 is a transition diagram in switching from the sleep mode to the long sleep mode.

In FIG. 8, the femtocell base station 101 transmits to a transmitting signal by including notice information. This notice information is one different from notice information to be contained in a transmitting signal of the usual macro cell base station 102.

In the case where the wireless terminals 103 and 104 transferred from the inside of area of the femtocell base station 101 to the inside of area of the base station 102, the wireless terminals 103 and 104 become to receive a transmitting signal from wireless base station 102. Here, the notice information to be contained in the transmitting signal from the wireless base station 102 is different from notice information to be contained in a transmitting signal of the femtocell base station 101. Therefore, the wireless terminals 103 and 104 perform update request of location information to the wireless base station 102. Update request of location information transmitted by the wireless terminals 103 and 104 to the wireless base station 102 is transmitted to the BSC 112 via the wireless base station 102 to update location registration information of the BSC. The BSC 112 notices that location information of the wireless terminal 103 and wireless terminal 104 was registered into the BSC, to the femtocell base station 101, where the wireless terminals 103 and 104 have been registered up to now. In this way, the femtocell base station 101 understands that the wireless terminals 103 and 104 are excluded from the territory of a local station.

The femtocell base station 101 switches from the sleep mode to the long sleep mode, when a wireless terminal is absent from the territory of a local station.

Then, explanation will be given on behavior in switching from the long sleep mode to the sleep mode, with reference to FIG. 9.

Figure 9:
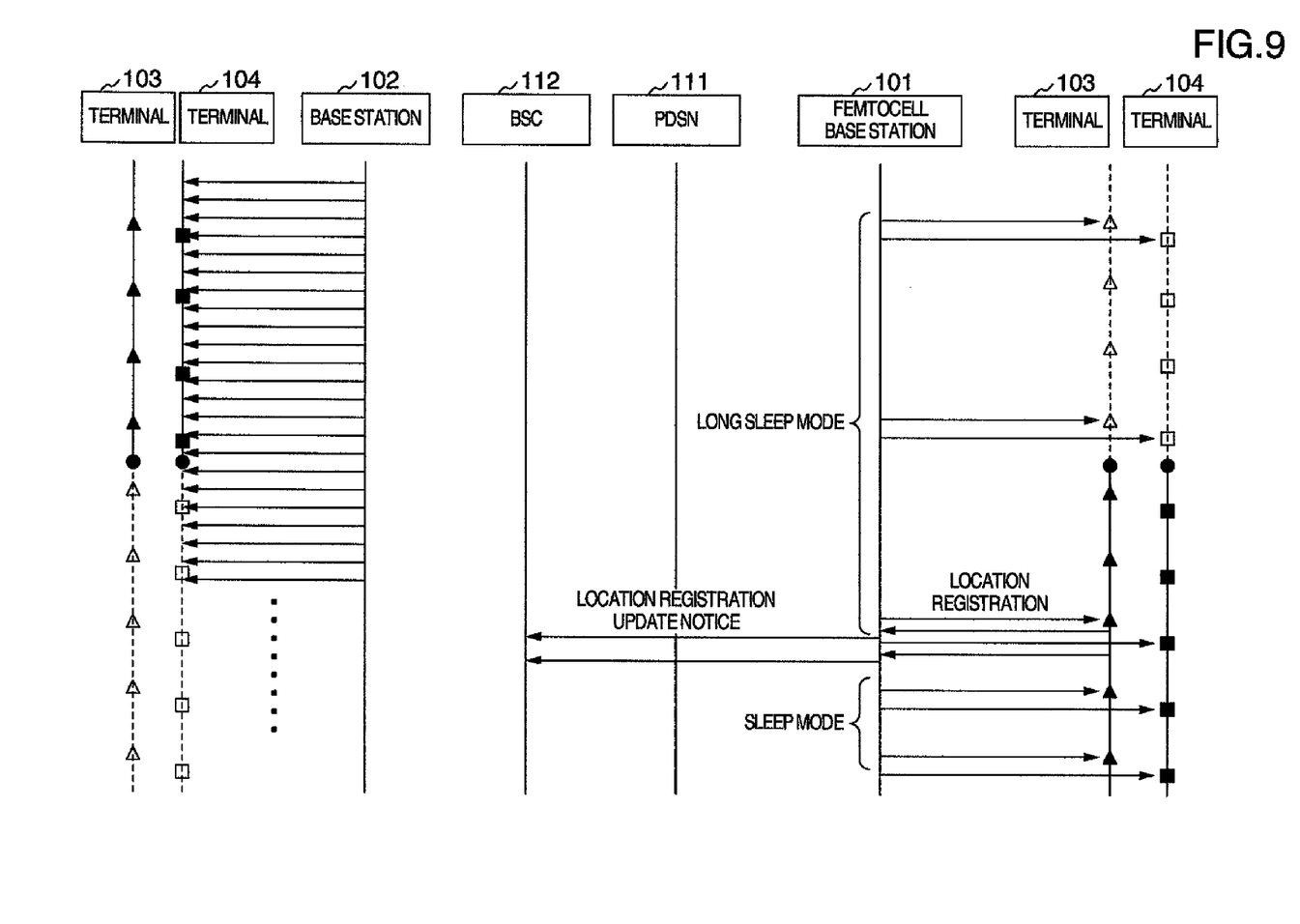
FIG. 9 is a drawing explaining the transition of an operational status of a femtocell base station and a wireless terminal.

FIG. 9 is a transition diagram in switching from the long sleep mode to the sleep mode.

In the case where a wireless terminal moves from the inside of area of the femtocell base station to outside of the area, and behavior is performed under the long sleep mode, a transmitter of the femtocell base station transmits a signal in a longer cycle as compared with the sleep mode, however, this transmission timing is synchronized with start timing of a wireless terminal whose location was registered before.

It is assumed that the wireless terminals 103 and 104 moved from the inside of the area of the base station 102 to the inside of the area of the femtocell base station 101. The wireless terminals 103 and 104 receive a transmitting signal from the femtocell base station 101, when certain period of time has passed after moving to the inside of the area of the femtocell base station 101. Because notice information to be included in this received signal is different as compared with the base station 102, the wireless terminals 103 and 104 perform update request of location information to the femtocell base station 101. As a result, location registration information of the femtocell base station 102 is updated. The femtocell base station 102 notices to the BSC 112 that location registration of the wireless terminals 103 and 104 was updated, resulting in switching from the long sleep mode to the sleep mode.

In this way, the femtocell base station 101 switches from the long sleep mode to the sleep mode.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless base station for transmitting and receiving a wireless signal with at least one wireless terminal existing in an area, comprising:
   a transmitter for transmitting the wireless signal, and a receiver for receiving the wireless signal;
   a timing management unit for managing the information on start timing of the transmitter and receiver, as well as noticing the information on start timing of the transmitter and receiver to the at least one wireless terminal; and
   a control unit for performing the switching control of start and stop of the transmitter and receiver,
   wherein the control unit controls start and stop of the transmitter and receiver, based on information on start timing, which is managed by the timing management unit.

2. The wireless base station according to claim 1, characterized in that;
   information on start timing of the transmitter and receiver, which the timing management unit manages, is information on start timing of the at least one wireless terminal; and
   the control unit controls start and stop of the transmitter and receiver, in matching to the start timing of at least one wireless terminal in an area, based on information on start timing of the at least one wireless terminal in the area, which is managed by the timing management unit.

3. The wireless base station according to claim 1, characterized in that the control unit transmits a wireless signal by starting the transmitter, based on information on the start timing, and controls so as to stop the transmitter during time other than the start timing.

4. The wireless base station according to claim 1, characterized in that the control unit starts the receiver, in matching to the start timing of the transmitter, as well as, in stopping time of the transmitter, stops the receiver, after certain time predetermined in advance has passed.

5. A wireless base station for transmitting and receiving a wireless signal with a wireless terminal, as well as transmitting and receiving the information via a higher rank apparatus connected to a communication network, characterized by comprising:
   a transmitter for transmitting the wireless signal, and a receiver for receiving the wireless signal;
   a timing management unit for managing the information on start timing of the wireless terminal; and
   a control unit for performing the switching control of start and stop of the transmitter and receiver,
   wherein the control unit, when information is received that a wireless terminal, which has been connected before to a local wireless base station, was location-registered to other wireless terminal, from the higher rank apparatus via the communication network, controls start and stop of the transmitter, in matching to the start timing of the wireless terminal, in a longer cycle as compared with the time when the wireless terminal has been connected to the local wireless base station, and based on information on start timing of the wireless terminal, which is managed by the timing management unit.

6. The wireless base station according to claim 5, characterized in that the control unit starts the receiver in matching to the start timing of the transmitter, as well as, in stopping time of the transmitter, stops the receiver, after certain time predetermined in advance has passed.

7. A wireless terminal for transmitting and receiving a wireless signal with a wireless base station, characterized by comprising:
   a transmission and reception unit configured with a transmitter and a receiver of the wireless signal;
   a modulation and demodulation processing unit configured with a modulation processing unit for performing the modulation of a transmitting signal, and a demodulation processing unit for performing the demodulation of a received signal;
   a timing management unit for managing the start timing of a receiver of a wireless base station; and
   an ON/OFF control unit for controlling the ON/OFF of the transmitter of the wireless terminal,
   wherein a wireless signal is transmitted to the wireless base station, in matching to the start timing of the receiver of the wireless base station.

8. A wireless terminal for transmitting and receiving a wireless signal with a wireless base station, characterized in that:
   the wireless base station has a plurality of operational modes, and is a wireless base station for changing the operational mode depending on a status of the wireless terminal existing in an area of a local wireless base station;
   wherein the wireless terminal comprises: a transmission and reception unit configured with a transmitter and a receiver of the wireless signal;
   a modulation and demodulation processing unit configured with a modulation processing unit for performing the modulation of a transmitting signal, and a demodulation processing unit for performing the demodulation of a received signal;
   a timing management unit for managing the start timing of a receiver of a wireless base station; and
   an ON/OFF control unit for controlling the ON/OFF of the transmitter of the wireless terminal, and
   wherein the wireless terminal receives a wireless signal transmitted from the wireless base station, recognizes the operational mode of the wireless base station from the wireless signal thereof, and transmits the wireless signal to the wireless base station in response to said operational mode recognized, in matching to the start timing of a receiver of the wireless base station.

9. A wireless communication system, comprising at least one wireless terminal existing in an area, and a wireless base station for transmitting and receiving a wireless signal with said wireless terminal, characterized in that the wireless base station comprises:
   a transmitter for transmitting the wireless signal, and a receiver for receiving the wireless signal;
   a timing management unit for managing information on start timing of the transmitter and receiver; and
   a control unit for performing the switching control of start and stop of the transmitter and receiver,
   wherein the timing management unit manages information on start timing of at least one wireless terminal existing in the area, and
   the control unit controls start and stop of the transmitter and receiver, based on information on start timing of the at least one wireless terminal in the area, which is managed by the timing management unit.

10. A wireless communication system, consisting of at least one first wireless base station having a narrow cover area, at least a second wireless base station having a wide cover area, a wireless base station controller for controlling the second wireless base station, and at least one wireless terminal, and the wireless communication system comprising a wireless base station for transmitting and receiving a wireless signal with the wireless terminal, Wherein the first wireless base station comprises:
a transmitter for transmitting the wireless signal, and a receiver for receiving the wireless signal; and
a control unit for performing the switching control of start and stop of the transmitter and receiver, wherein, in the case where the wireless terminal, which received update request of location information from the second wireless base station, was a wireless terminal registered to the first wireless base station before that, the wireless base station controller notices that location information of said wireless terminal was updated, to the first wireless base station, and in receiving said notice, a control unit of the first wireless base station controls a transmitter of the first wireless base station, so as to transmit a wireless signal, in a longer cycle and in timing synchronized with the start timing of the wireless terminal.

* * * * *